United States Patent [19]
Harrington

[11] Patent Number: 5,598,204
[45] Date of Patent: Jan. 28, 1997

[54] IMAGE HALFTONING SYSTEM CAPABLE OF PRODUCING ADDITIONAL GRADATIONS

[75] Inventor: Steven J. Harrington, Holley, N.Y.

[73] Assignee: Xerox Corporation, Stamford, Conn.

[21] Appl. No.: 217,836

[22] Filed: Mar. 25, 1994

[51] Int. Cl.$^6$ ........................................... H04N 1/21
[52] U.S. Cl. .............................. 347/251; 358/298
[58] Field of Search ........................ 347/251, 252, 347/253, 254, 240, 131; 358/296, 298, 456, 460, 455

[56] References Cited

U.S. PATENT DOCUMENTS

| | | | |
|---|---|---|---|
| 3,977,007 | 8/1976 | Berry et al. | 346/1 |
| 4,280,144 | 7/1981 | Bacon | 358/280 |
| 4,353,079 | 10/1982 | Kawanabe | 346/140 |
| 4,412,226 | 10/1983 | Yoshida | 346/1.1 |
| 4,593,297 | 6/1986 | Suzuki et al. | 346/160 |
| 4,746,935 | 5/1988 | Allen | 346/140 |
| 4,916,545 | 4/1990 | Granger | 358/456 |
| 4,999,646 | 3/1991 | Trask | 346/11 |
| 5,012,257 | 4/1991 | Lowe et al. | 346/1.1 |
| 5,016,191 | 5/1991 | Radochonski | 364/518 |
| 5,321,525 | 6/1994 | Hains | 358/456 |
| 5,410,414 | 4/1995 | Curry | 358/298 |

FOREIGN PATENT DOCUMENTS 60-250774  12/1985  Japan.

OTHER PUBLICATIONS

Hybrid (Gray Pixel) Halftone Printing by Larma et al. Journal of Imaging Technology, vol. 15, No. 3, Jun. 1989.

IBM Technical Disclosure Bulletin vol. 23, No. 11, Apr. 1981, pp. 5225–5226 "High Resolution Display and Printing Technique" by Yao.

*Primary Examiner*—Mark J. Reinhart
*Attorney, Agent, or Firm*—Thomas B. Zell; Duane C. Basch

[57] ABSTRACT

A method for forming a plurality of halftone density patterns in an image processing system. Each density pattern is formed using a halftone cell that is incrementally grown according to a pixel growth pattern that is defined by the position of each threshold value in the halftone cell. The plurality of halftone density patterns are formed in accordance with at least two tests, one for an upper gray density boundary U(d) and one for a lower gray density boundary L(d). The two gray density boundary tests enables different density patterns having the same number of pixels but different densities to be formed by altering the growth pattern of the halftone cell. The two boundaries U(d) and L(d) define a valid range for each gray density threshold in a halftone cell. The defined range insures that pixels are added or removed along the pixel growth pattern of the halftone cell, thereby altering the perceived density of halftone density patterns having an equal number of pixels.

28 Claims, 12 Drawing Sheets

$$T_1(m,n) = \begin{array}{|c|c|c|c|} \hline 14 & 8 & 6 & 4 \\ \hline 12 & 10 & 0 & 2 \\ \hline \end{array}$$

| d | U | L | |
|---|---|---|---|
| 0 | 0 | 0 | |
| 1 | 1 | 0 | |
| 2 | 2 | 0 | |
| 3 | 3 | 0 | |
| 4 | 5 | 1 | |
| 5 | 5 | 0 | |
| 6 | 9 | 3 | |
| 7 | 7 | 0 | ← 53 |
| 8 | 9 | 1 | ← 55 |
| 9 | 9 | 0 | |
| 10 | 11 | 1 | |
| 11 | 11 | 0 | |
| 12 | 15 | 3 | |
| 13 | 13 | 1 | |
| 14 | 14 | 0 | |
| 15 | 15 | 0 | |

*FIG. 6*

| d | U | S | L |
|---|---|---|---|
| 0 | 0 | 52 | 0 |
| 1 | 2 | 52 | 0 |
| 2 | 5 | 52 | 0 |
| 3 | 2 | 51 | 0 |
| 4 | 8 | 52 | 0 |
| 5 | 5 | 51 | 0 |
| 6 | 11 | 52 | 0 |
| 7 | 10 | 51 | 0 |
| 8 | 14 | 52 | 0 |
| 9 | 17 | 52 | 1 |
| 10 | 11 | 51 | 0 |
| 11 | 14 | 51 | 1 |
| 12 | 17 | 52 | 0 |
| 13 | 20 | 52 | 1 |

GOTO FIG. 11

FIG. 10

| FROM FIG. 10 | 14 | 14 | 51 | 0 |  |
| --- | --- | --- | --- | --- | --- |
| | 15 | 17 | 51 | 1 |  |
| | 16 | 21 | 52 | 1 |  |
| | 17 | 23 | 52 | 1 |  |
| | 18 | 18 | 51 | 0 |  |
| | 19 | 20 | 51 | 1 |  |
| | 20 | 23 | 52 | 0 |  |
| | 21 | 27 | 51 | 1 |  |
| | 22 | 20 | 51 | 0 |  |
| | 23 | 23 | 51 | 1 |  |
| | 24 | 26 | 52 | 0 |  |
| | 25 | 29 | 52 | 1 |  |
| | 26 | 23 | 51 | 0 |  |
| GOTO FIG. 12 | 27 | 26 | 51 | 1 |  |

| | | | | |
|---|---|---|---|---|
| FROM FIG. 11 | 28 | 29 | 52 | 0 |  |
| | 29 | 32 | 52 | 1 |  |
| | 30 | 26 | 51 | 0 |  |
| | 31 | 35 | 51 | 1 |  |
| | 32 | 32 | 52 | 0 |  |
| | 33 | 35 | 52 | 1 |  |
| | 34 | 29 | 51 | 0 |  |
| | 35 | 32 | 51 | 1 |  |
| | 36 | 35 | 52 | 0 |  |
| | 37 | 38 | 52 | 1 |  |
| | 38 | 32 | 51 | 0 |  |
| | 39 | 35 | 51 | 1 |  |
| | 40 | 38 | 52 | 0 |  |
| GOTO FIG. 13 | 41 | 41 | 52 | 1 |  |

| FROM FIG. 12 | 42 | 39 | 51 | 0 |  |
|---|---|---|---|---|---|
| | 43 | 44 | 52 | 1 |  |
| | 44 | 44 | 52 | 0 |  |
| | 45 | 47 | 52 | 1 |  |
| | 46 | 50 | 52 | 1 |  |
| | 47 | 50 | 52 | 0 |  |
| | 48 | 53 | 52 | 0 |  |

IMAGE HALFTONING SYSTEM CAPABLE OF PRODUCING ADDITIONAL GRADATIONS

The present invention relates to a digital halftoning system, and in particular to a method and apparatus for increasing the number of gradations reproducible using a halftone cell.

BACKGROUND OF THE INVENTION

Image information, be it color or black and white, is commonly generated in a raster format where the raster comprises a plurality of gray level pixels, i.e. pixels that are defined by digital values, each value representing a gray level among a number of gray levels. Thus, in an 8 bit system, 256 levels of gray are present, where each level represents an increment of gray between black and white. In the case of color rasters, where three defining colors or separations each include 256 levels of information, there may be more than 16 million colors defined by a gray bitmap. Some image output terminals (IOTs) typically print in a limited number of levels, either a spot or a no spot in the binary case, or a limited number of levels associated with the spot, for example, four in the quaternary case. Accordingly, it is necessary to reduce the gray level image data to a limited number of levels so that it can be printed. Digital halftoning methods provide a method of rendering images having a continuum of grays on binary image output terminals (IOTs) such as electronic printers.

One standard method for converting gray level pixel values to binary level pixel values is through the use of dithering or halftoning. In such arrangements, patterns of black and white dots, which appear gray when viewed from a distance, are used to represent different levels of gray. These dots or halftone cells are typically formed from binary pixels which are the smallest reproducible black or white picture elements of IOTs. Thus, halftoning defines various levels of gray using different distribution of binary pixels in each halftone cell. In general, halftoning can be described using the boolean valued function:

$$H_1(x, y, d) = d > T(x \bmod M, y \bmod N),$$

which determines if a pixel or an area of pixels at position (x, y) in a gray image should be black or white. The function $H_1(x, y, d)$ compares the darkness or depth d of the gray pixel or area at position (x, y) with a threshold value T of a predetermined halftone cell (M×N) replicated to cover the image. Since this function must be applied to every pixel in the gray image it must be simple and quick to calculate using hardware or software.

A number of different threshold patterns have been used to describe a halftone cell or dot as shown in FIG. 15. These threshold patterns indicate the order in which pixels are switched from white to black to form dots of varying gray density. Typically, a threshold pattern can be classified as either a disperse dot or a cluster dot, examples of which are dots 90 and 91, respectively. Besides generating different formations of halftone dots for an identical gray image area, the halftoning method used to apply the disperse or cluster threshold pattern to the image area also results in different formations of halftone dots being generated. For example, each 4-bit pixel in an area of gray image data 92 can be halftoned using a dither method (e.g. partial dotting). Using the dither method, each gray pixel in the cell 92 is compared to disperse dot threshold pattern 90 or the cluster dot threshold pattern 91 in accordance with the function $H_1(x, y, d)$ to produce halftone areas 94 and 95, respectively. Halftone areas 94 and 95 are grown incrementally, since each dot in the halftone cell is evaluated individually. Alternatively using a template dot or density pattern method, the gray image area 92 could be represented using its average gray density 9 in image area 93, which would result in the halftone areas 96 and 97 when thresholded using halftone threshold patterns 90 and 91, respectively.

Using either the dither method or density pattern method, described above, gray density of a binary image increases as more of the pixels in a halftone dot or cell are colored black. Also when pixels are added to a halftone dot one by one using either the disperse or cluster threshold pattern, the number of gray density levels for a binary image is given by the number of pixels in the halftone cell plus one (i.e. gray levels=1+mn). A fundamental drawback of these halftone methods is a tradeoff that exists between the number of gray levels in a halftone cell (fidelity) and resolution of the reproducing device which are traditionally binary, such as printers. Reducing the size of the halftone cell to include fewer pixels increases the effective resolution of a binary image while reducing the number of gray levels. Thus, an image reproduced with a high effective resolution will result in sharp detail, while an image reproduced with many intensity levels will result in very uniform grays or colors with high fidelity.

Halftoning presents problems since the amount of gray within an original image is not maintained exactly over an area, because the finite number of elements inside each halftone dot. The error arising from the difference between the output pixel value and the actual gray level pixel value at any particular cell is simply thrown away. This results in a loss of image information which introduces coarse quantization artifacts which are visible in the image areas where the scene has little variation. This is also known as "banding", and is caused by the limited number of output gray levels available. The "banding" artifacts generally increase with decreasing cell size, which is identical to a decrease in the number of levels that can be represented by a halftone cell.

Another problem associated with halftoning is that the shades of gray generated using a halftone cell on digital printing devices such as xerographic printers and thermal ink jet printers do not yield a visually linear progression of shades of gray. In fact the change from no dots in a matrix cell to one dot is a much more pronounced change in the visual perception of the shade then the change from one less than the maximum number of dots to the maximum number of dots. That is, each dot has a far greater visual effect at the light end of the tone scale than at the dark end. Consequently, fewer visually equal tones are possible than the number of dots in a halftone cell would at first suggest. In both xerography and ink jet printing attempts have been made to improve the image quality of the reproduced image.

Xerographic printers, for example, do not always render faithful copies of continuous tone originals, since typically such printers have a tone reproduction curve (TRC) with a steep slope due to either the discharge characteristic of the photoreceptor or the solid area development characteristic of the xerographic development system, or both. As a result, reproduced images may have washed-out highlights or overdeveloped shadows. At distances closer than the normal viewing distance, or when the size of the halftone cells are large, the quality of the reproduced picture is decreased. Just acceptable graininess requires at least 65 halftone cells per inch. A good quality halftone requires about 100 cells per inch. High quality (e.g., magazine type) requires about 150 cells per inch. A hybrid system consisting of a halftone with three or four gray levels is described in a publication entitled "Hybrid (Gray Pixel) Halftone Printing", by Lama et al. in the Journal of Imaging Technology, Vol. 15, no. 3, June, 1989.

Thermal ink jet printers, on the other hand, have used various approaches to control the overall halftone pattern by altering the size and spacing of individual ink drops to enhance the uniformity and consistency of halftone patterns. The various schemes include dot-on-dot and dot-next-to-dot techniques. Dot-on-dot techniques use identical halftone patterns for more than one color separation so that dots in those separations will be placed at the same location, while dot-next-to-dot techniques place the colors in a way that avoids overlap when possible. Both techniques are disclosed in the following U.S. Pat. Nos. 3,977,007; 4,280,144; 4,999,646; 5,016,191; 5,012,257; 4,746,935; 4,412,226; and 4,353,079 and U.S. Patent Application entitled "Ink Jet Printhead for Continuous Tone and Text Printing", to Rezanka, U.S. Ser. No. 08/000,375, filed Jan. 4, 1993.

Besides actually altering the physical device to provide an additional number of gray scale levels, techniques have been developed that enable the generation of halftone images with less textured background and better gray scale reproduction without losing resolution. A method of achieving multiple gradations for halftone imaging by arranging a specified number of dots in a plurality of ways (e.g. overlapping or non-overlapping dots) to obtain various gradations is published in JP-A 60-250774 to Inui on Dec. 11, 1985. IBM Technical Disclosure Bulletin Volume 23, No. 11, April 1981, pages 5225–5226, entitled "High Resolution Display and Printing Technique" by Yao, discloses a process for increasing image quality without increasing the number of pixels making up the image. The positions of pixels are perturbed to achieve smoother line images, while the total number of pixels in a field does not change. Every pixel may be positioned at one of several different locations. U.S. Pat. No. 4,593,297 to Suzuki et al. teaches that a plurality of image densities are rendered on a two-dimensional dot matrix basis by using a plurality of different gradation density patterns. Each gradation density pattern is determined by the number of dots employed and the direction of arrangement of the dots in the dot matrix.

Problems however exist with techniques that provide additional gray levels without increasing halftone cell size with patterns that are completely unrelated. Haftone patterns that are unrelated, even if they have almost the same gray level, have a tendency to cause noticeable discontinuities in the texture at the boundary between two halftone patterns. The halftone techniques that increase the number of available density patterns typically use arbitrary halftone cell patterns rather than patterns formed by incremental cell growth (or partial dotting). Using incremental cell growth with such halftoning techniques complicate the halftone function:

$$H_2(x, y, d) = d > T(d, x \text{ MOD } M, y \text{ MC}) D \text{ } N),$$

since the thresholds T(d, m, n) must be indexed by darkness or depth d as well as the position of each gray pixel. Additionally indexing depth d requires additional storage and index computation above that required for halftone function $H_1(x, y, d)$. For example, simple increments and compares in halftone function $H_1(x, y, d)$ are substituted in halftone function $H_2(x, y, d)$ for MOD operations that are more computationally difficult.

SUMMARY OF THE INVENTION

In accordance with one aspect of the invention there is provided an apparatus for converting gray image signals to binary image signals, with each gray image signal having a gray density value. The apparatus includes a memory for storing the gray image signals and the binary image signals, each gray image signal stored in the memory being associated with a relative position in a halftone cell having a set of threshold values. Means, associated with said memory, for assigning a threshold value to each gray image signal in accordance with the relative position of each threshold value in the halftone cell, and defining a range of gray density values for each gray image signal. A logic circuit, in communication with said assigning means, for forming a halftone density pattern for the gray image signals having the threshold value assigned thereto within the range of gray density values for the corresponding gray image signal.

In accordance with another aspect of the invention there is provided a method for converting gray image signals to a binary image signals, with each gray image signal having a gray density value. The method including the steps of associating each gray image signal with a relative position in a halftone cell having a set of threshold values, with each threshold value cell being associated with a position in the halftone cell; assigning a threshold value to each gray image signal in accordance with the relative position of each threshold value in the halftone cell; defining a range of gray density values for each gray image signal; and forming a halftone density pattern for the gray image signals having the threshold value assigned thereto within the range of gray density values for the corresponding gray image signal.

In accordance with yet another aspect of the invention there is provided a method for forming a plurality of halftone density patterns in an image processing system from a pixel growth pattern of a halftone cell, the halftone cell having a set of density threshold values, with each threshold value being associated with a pixel in the halftone cell. The method including the steps of altering the pixel growth pattern of the halftone cell using a selected range of density values for each threshold value in the halftone cell; and defining the range of density values such that pixels are added and removed along the pixel growth pattern of the halftone cell to alter the perceived density of halftone density patterns having an equal number of pixels.

BRIEF DESCRIPTION OF THE DRAWINGS

These and other aspects of the invention will become apparent from the following descriptions to illustrate a preferred embodiment of the invention read in conjunction with the accompanying drawings wherein the same reference numerals have been applied to like parts and in which:

FIG. 6 is an example of an upper and lower boundary lookup table (LUT) for a gray density value;

FIGS. 10–13 are an example of an upper, lower and cluster boundary lookup table (LUT) for a gray density value;

DETAILED DESCRIPTION

Figure 1:
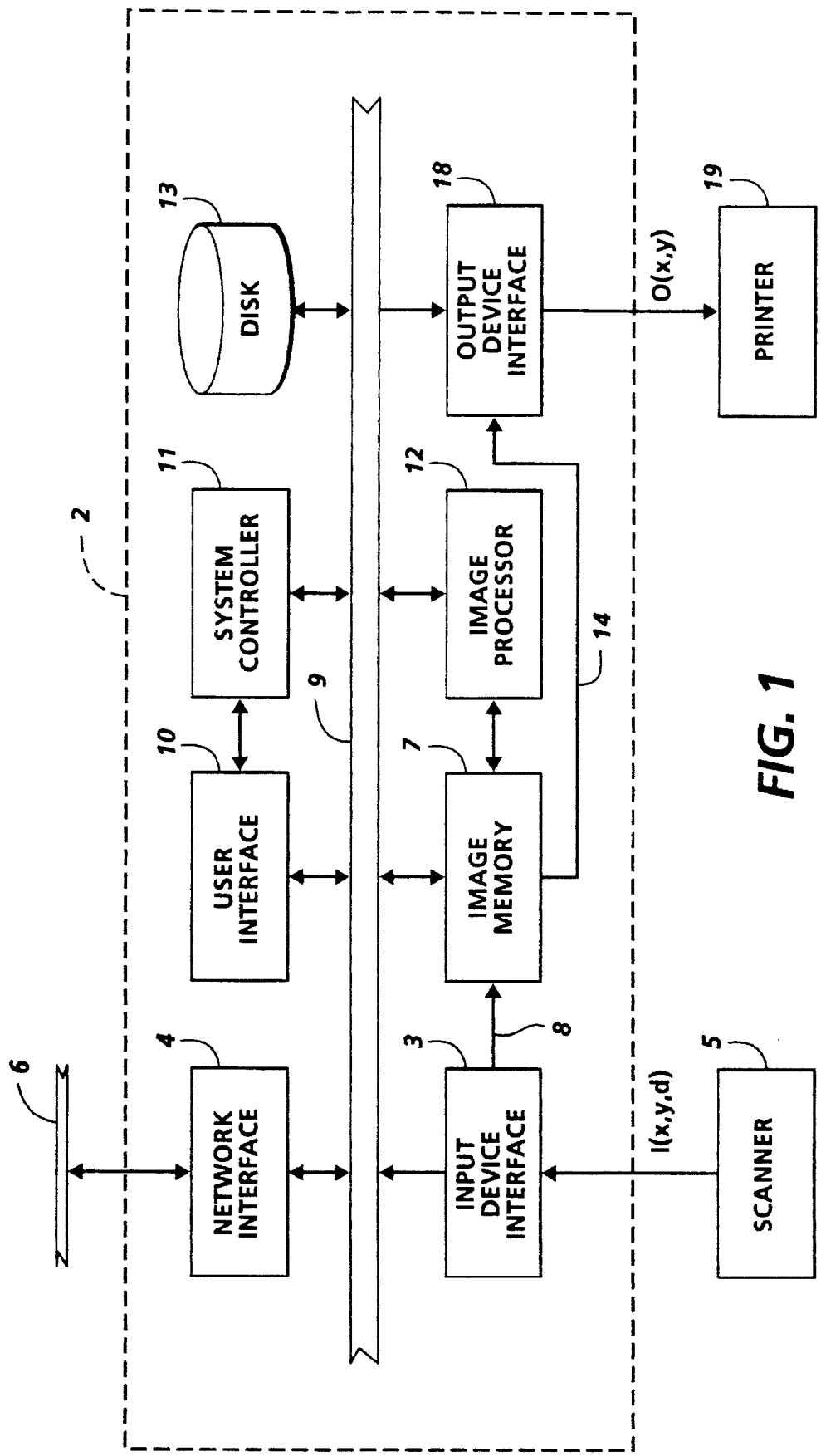
FIG. 1 is a block diagram of an image processing system incorporating the present invention.

For a general understanding of features of the present invention, references are made to the drawings. With reference now to FIG. 1 where the showing is for describing the present invention and not for limiting same, there is shown an image processing system 2. The image processing system 2 receives image information either through input device interface 3 or network interface 4. In this embodiment, input device interface 3 is connected to scanner 5 which generates raster images I(x, y, d) having a defined width x, length y and depth or darkness d. Alternatively, image information received through network interface 4 from network 6 can be transmitted from devices such as remote scanners, file servers or page description language (PDL) drivers (not shown). In effect information received through network interface 4 may contain in part or in full image information in the form of raster images having a defined width, length and depth.

Once a raster image is received from scanner 5 by image processing system 2, the raster image I(x, y, d) is transmitted to image memory 7 either through connection 8 or data bus 9 as directed by system controller 11. In the event image information is simultaneously received through interfaces 3 and 4, controller 11 routes image information from network 6 to secondary storage or hard disk 13 through data bus 9 and image information from input device or scanner 5 to primary storage or image memory 7 using connection 8. Once image information such as raster image I(x, y, d) is received and stored in memory 7, image processor 12 is invoked by controller 11 as programmed through user interface 10 which operates on a video display or the like. Subsequent to processing raster image I(x, y, d) resulting binary image information O(x, y) (e.g. black or white pixel values) stored in memory 7 is either reproduced on output device or printer 19 through connection 14 and output device interface 18 or transmitted to secondary storage 13 or a remote device connected to network 6 through data bus 9.

Figure 2:
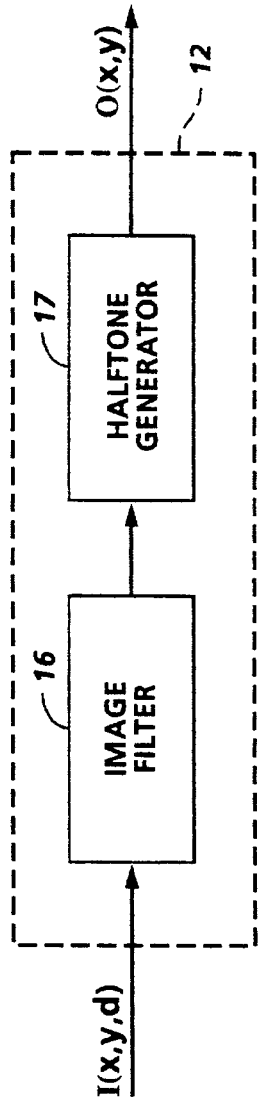
FIG. 2 is a detailed block diagram of the image processor shown in FIG. 1.

With reference now to FIG. 2, gray raster information forming image I(x, y, d) once stored in memory 7 is converted to a binary image using halftone generator 17 before reproduction on binary output device or printer 19. Image processor 15 may process input image I(x, y, d) with filter 16 before halftoning is performed in accordance with the invention using halftone generator 17. Image filter 16 can include image processing functions such as image enhancement or resolution conversion. Processing is performed by image filter 16 to enhance, clean, convert to an appropriate format or scale to a suitable size input image I(x, y, d) for processing by halftone generator 17. In general, filter 16 pre-processes an image for halftone generator 17 so that the resulting halftone image is optimized in accordance with physical properties of a particular output device reproducing the halftone image output by halftone generator 17.

Figure 3:
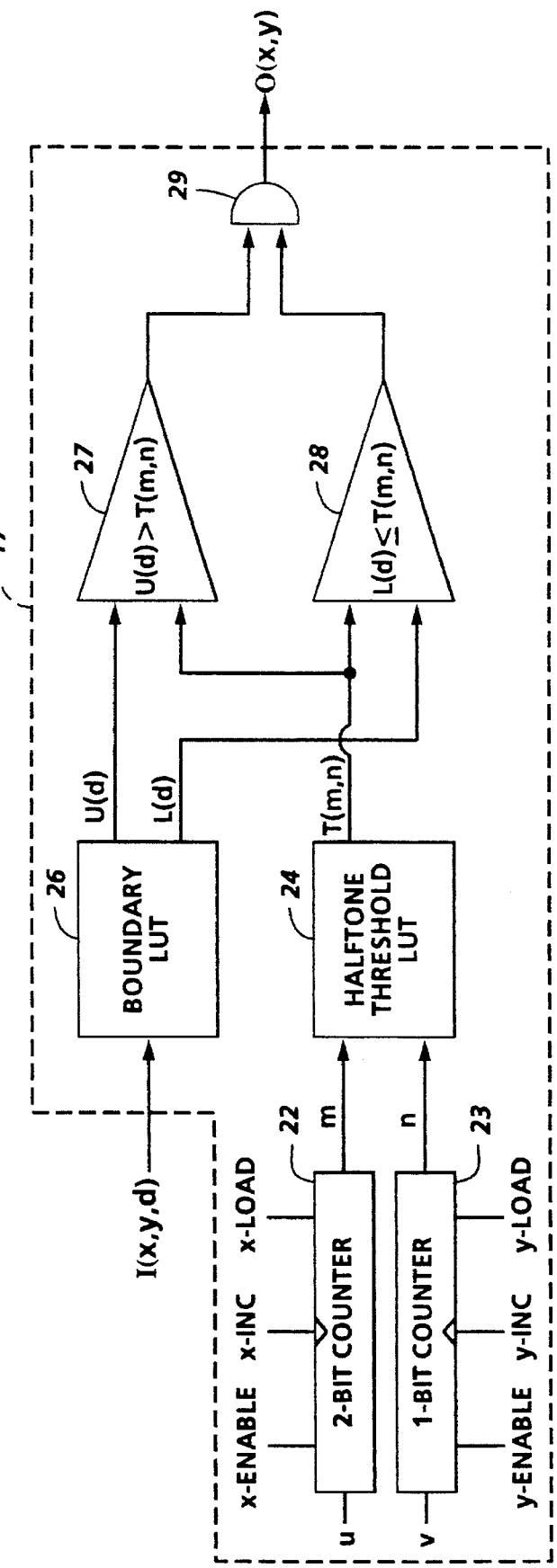
FIG. 3 is a detailed block diagram of the first embodiment of halftone generator shown in FIG. 2.
Figures 4, 5:
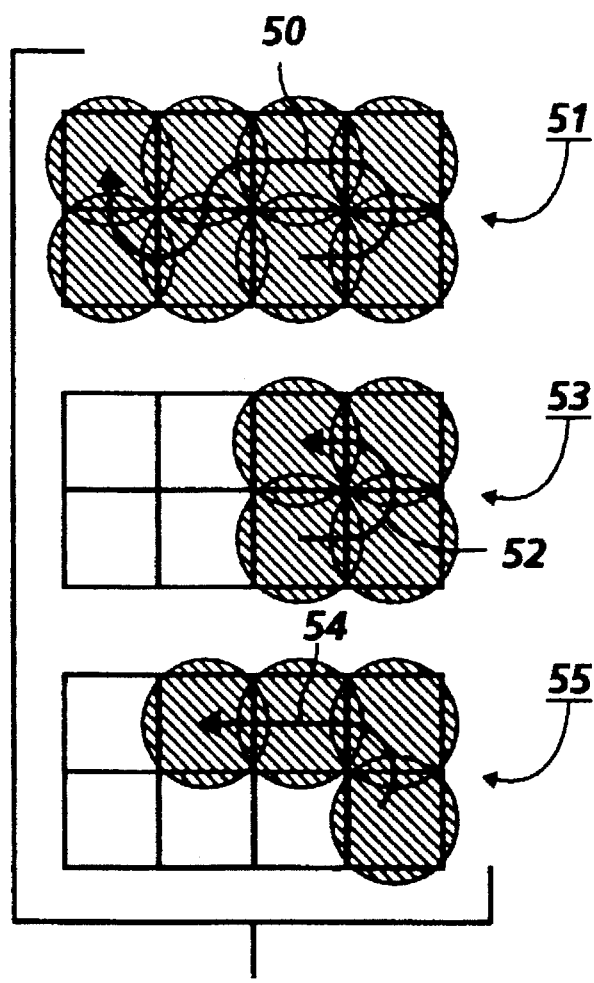
FIG. 4 is a first example of a halftone cell showing the gray density thresholds for each pixel in the halftone cell.
FIG. 5 shows the pixel growth patterns of the halftone cell in FIG. 4, incorporating one aspect of the present invention.

FIG. 3 shows a first embodiment of halftone generator 17 that receives as input raster image I(x, y, d) and produces as output binary image O(x, y), both of which are stored in memory 7 of system 2. Initially, system controller 11 selects from one or more halftone cells and screen angles that can be used for processing input image I(x, y, d). A halftone cell is generally formed using a matrix of M×N gray density threshold values. For example halftone cell $T_1(m, n)$ is formed using a 4×2 matrix of threshold values as shown in FIG. 4. The halftone cell $T_1(m, n)$ and screen angle selected by controller 11 are defined using halftone generator variables m, n and u, v respectively. Screen variable u, v are used to offset adjacent halftone cells on neighboring scanlines and are therefore typically set or reset at the start of image scanlines. The shapes and values of halftone cell thresholds and screen angles do not form part of the present invention, which are well known and taught in "Digital Halftoning" by R. Ulichney, The MIT Press, Cambridge, Ma. (1987) and in U.S. Pat. No. 4,149,194 to Hoiladay, the pertinent portions of which are incorporated herein by reference.

In processing each scan line of raster input image I(x, y, d), image signals are transmitted from memory 7 or directly from pre-processing filter 16. Each gray level pixel or gray image signal in raster image I(x, y, d) is generally processed from left to right for each scan line in the image. Each gray level pixel transmitted to halftone generator 17 is defined with position (x, y) and a depth d. The position (x, y) for each gray level pixel of the input image is used to determine a threshold value in the halftone cell, $T_1(m, n)$. In the embodiment shown in FIG. 3, halftone cell $T_1(m, n)$ shown in FIG. 4 is overlayed on raster image I(x, y, d) using modulus-n 2-bit counter 22 and 1-bit counter 23. In alternate embodiments having a halftone cell size (M×N) where the halftone cell dimensions M and N do not repeat every modulus-n, generic M-limited counters that count for any specified interval can be substituted for counters 22 and 23. Counters 22 and 23 are initialized with screen variable u and v using the load switches x-load and y-load, and indexed using increment switches x-inc and y-inc when the enable switches x-enable and y-enable are set. 2-bit counter 22 which is indexed for each pixel along each scan line in the raster image I(x, y, d) determines halftone cell variable m while 1-bit counter 23 which is indexed at the end of each scan line in the raster image I(x, y, d) determines halftone cell variable n. Once halftone cell variables m and n are determined for a gray input pixel, variables m and n are used to index halftone cell $T_1(m, n)$ shown in FIG. 4 and stored in halftone threshold look up table (LUT) 24 for a corresponding threshold value ("t").

In accordance with the invention, the gray density or depth d of each input pixel forming raster image I(x, y, d) is used to define an upper boundary U(d) and a lower boundary L(d) density threshold limit. The upper and lower boundaries U(d) and L(d) provide means for generating additional gradations above the number of gradations given by the number of pixels in a halftone cell plus one. Accordingly, a set of halftone patterns with varying densities are defined by adding and removing pixels to form dot patterns that are ordered by increasing or decreasing density threshold values. Each halftone pattern is formed using a predefined order and not by a random arrangement of pixels. For example, the halftone cell $T_1(m, n)$ in FIG. 4 has density thresholds (e.g. 0, 2, 4, 6, 8, 10, 12, 14) that increases in order or pixel growth pattern as outlined by arrow 50 in cell 51. Thus, different dot patterns having the same number of pixels but different densities can be formed by altering the density threshold pixel growth pattern. In FIG. 5, for example arrow 52 shows the pixel growth pattern of cell 53 while arrow 54 shows the pixel growth pattern of cell 55. Although, cells 53 and 55 have an equal number of pixels, cell 53 has less gray density than cell 55 because of the arrangement of pixels inside each respective cell.

The halftone function of the invention, therefore, contains at least two tests, one for the upper gray density boundary U(d) and one for the lower gray density boundary L(d):

$$H_3(x, y, d) = U(d) > T(m, n) \text{ AND } L(d) \leq T(m, n).$$

The resulting halftone function $H_3(x, y, d)$ therefore defines a range in which a density threshold value $T(m, n)$ is valid. If the density of a pixel has a density threshold value $T(m, n)$ outside the range established by the upper and lower corresponding gray density boundaries $H(d)$ and $L(d)$ respectively, then the resulting binary pixel value is set to white otherwise it is set to black. For example, the corresponding upper gray density boundary U(d) and lower gray density boundary L(d) for all possible gray density values "d" of 4-bit gray pixel or image signal is shown in FIG. 6. For example, if each pixel within a cell has a gray density value of 7 (e.g. d=7), then the upper gray density boundary U(d) would equal 7 and the lower boundary L(d) would equal 0 for each pixel and would result in halftone cell 53. Each halftone cell (such as cell 53) next to each 4-bit density value "d" and corresponding U(d) and L(d) values in FIG. 6 provide one of many possible outcomes since each pixel in raster image I(x, y, d) is examined individually. Each halftone pattern in FIG. 6 is only representative of the resulting halftone pattern when each pixel in each overlaying halftone cell of the raster image has a gray density value that satisfies halftone function $H_3(x, y, d)$.

With reference again to FIG. 3, gray density value d for each pixel in raster image I(x, y, d) is transmitted to boundary look up table (LUT) 26. In one embodiment, boundary LUT 26 is formed using 4-bit gray density values d having pre-defined, upper U(d) and lower L(d) gray density boundaries values shown in FIG. 6. For each gray density d input to boundary LUT 26 corresponding values for upper U(d) and lower L(d) gray density boundaries are output and transmitted to comparators 27 and 28 respectively. Comparator 27 determines for each pixel (x, y) whether upper gray density boundary U(d) is greater than the threshold value assigned from halftone cell $T_1(m, n)$. Comparator 28 determines for each pixel (x, y) whether lower gray density boundary L(d) is less than or equal to the threshold value assigned from halftone cell $T_1(m, n)$. The output from comparators 27 and 28 are subsequently evaluated at AND gate 29 to provide binary output value O(x, y). For example, if 4-bit gray pixel I(x=2, y=2) has gray density d=9 and u=v=0 at (x=0, y=0), then T(m=1,n=1)=10 (according to FIG. 4), U(9)=9 and L(9)=0 (according to FIG. 6), which results in AND gate 29 output of O(x=2, y=2)=0. Output from AND gate 29 is transmitted from halftone generator 17 and stored in memory 7 as a binary gray value (where binary is one level of gray, black or white). The binary value indicates whether a pixel in a halftone cell is on or off.

With reference again to FIG. 1, once image processor 15 completes processing of raster image I(x, y, d) and stores the halftone output image O(x, y) in image memory 7, system controller 11 transmits the binary output image O(x, y) to output device interface 18 via connection 14 for output to binary printer 19. Alternatively, binary output image O(x, y) can be transmitted to secondary storage 13 or to network interface 4 through data bus 9. A binary output image transmitted to network interface 4 can then be transmitted using network 6 to printers, display or storage devices connected hereto. Binary output images stored in memory 7 can also be previewed on user interface 10 before reproduction on printer 19. If found to be unsatisfactory, halftone generator cell and screen angle variables u and v as well as pre-processing operations performed by image filter 16 can be altered and the original image I(x, y, d) processed again to produce a second binary output image O(x, y) having different image qualities than the first.

Figure 7:
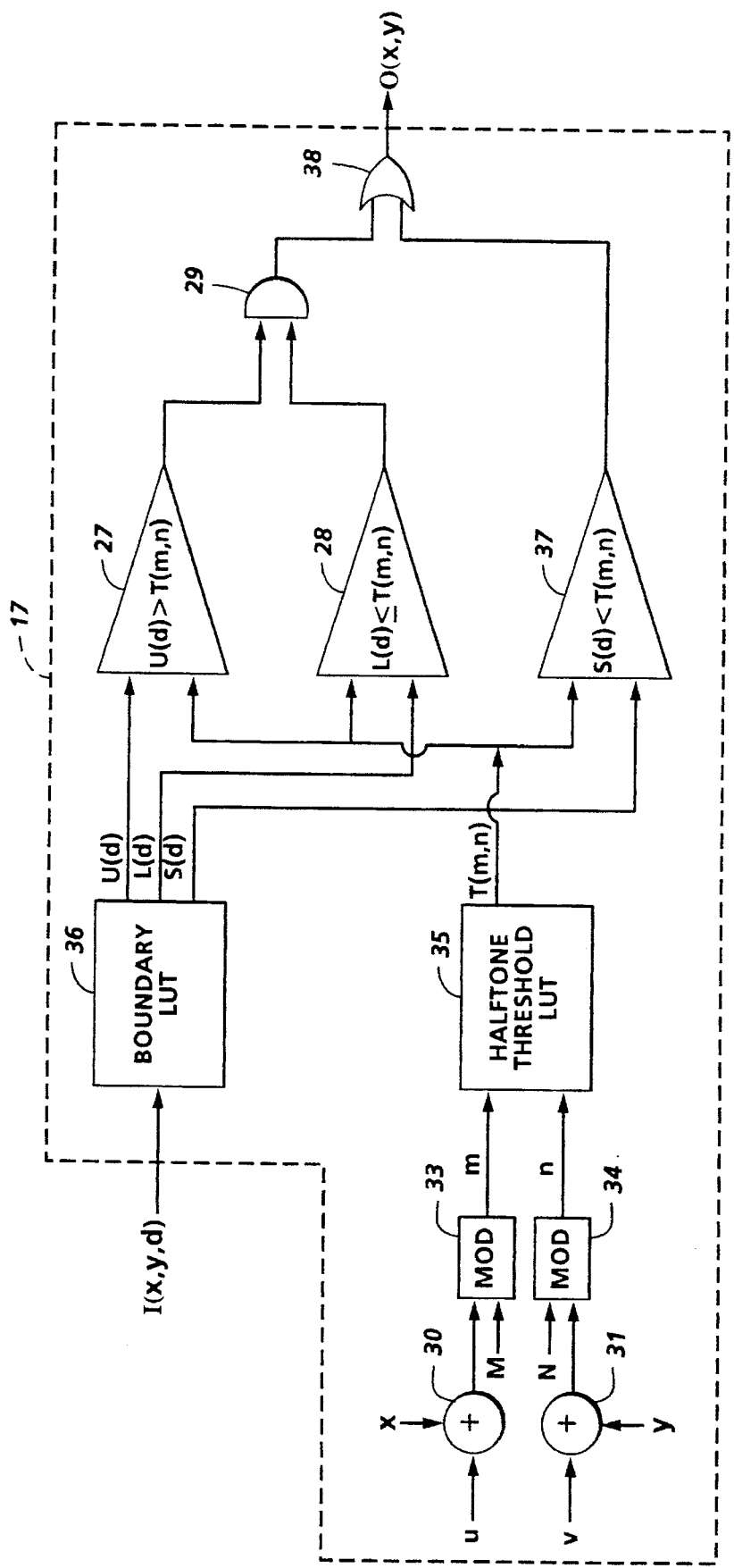
FIG. 7 is a detailed block diagram of the second embodiment of halftone generator shown in FIG. 2.

In an alternate embodiment, image processor 10 is modified to use halftone generator 17 shown in FIG. 7 to process raster image I(x, y, d) in accordance with following halftone function:

$$H_4(x,y,d) = ((U(d) > T(m,n)) \text{ AND } (L(d) \leq T(m,n))) \text{ OR } (S(d) < T(m,n)).$$

Figures 8, 9:
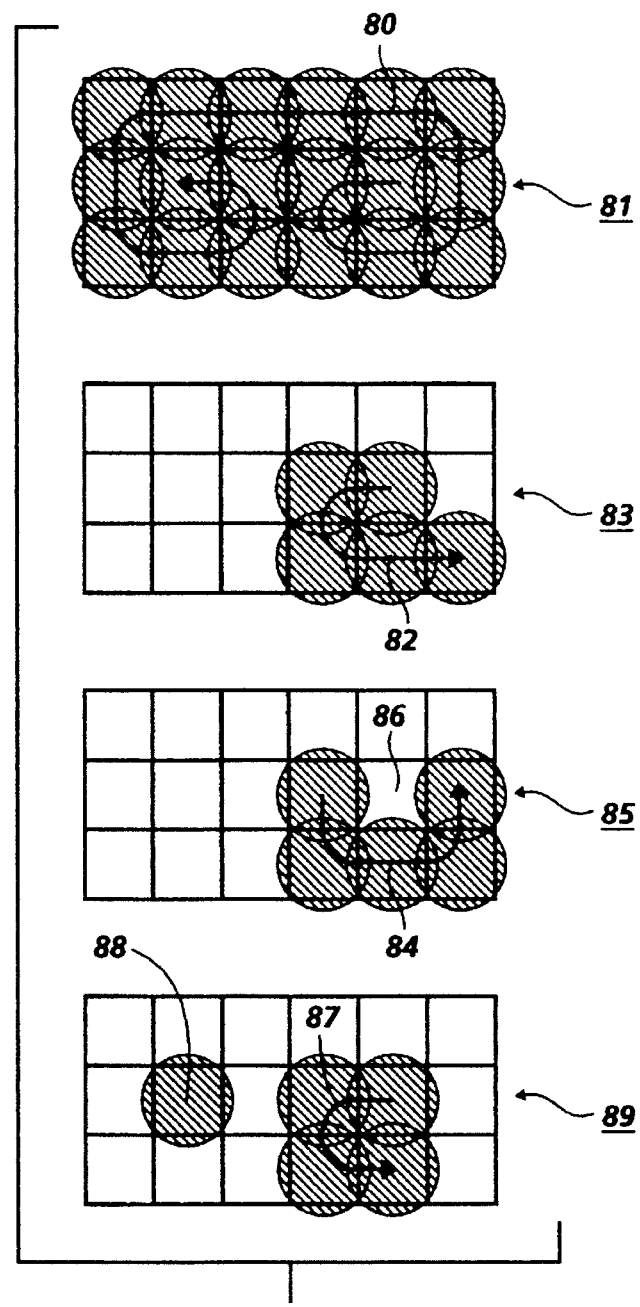
FIG. 8 is a second example of a halftone cell showing the gray density thresholds for each pixel in the halftone cell.
FIG. 9 shows the pixel growth patterns of the halftone cell in FIG. 8, incorporating one aspect of the present invention.
Figure 11:
Figure 11:
Figure 11:
Figure 11:
Figure 11:
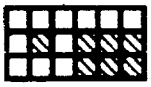
Figure 11:
Figure 11:
Figure 11:
Figure 11:
Figure 11:
Figure 11:
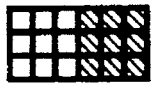
Figure 11:
Figure 11:
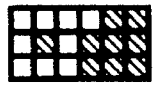
Figure 11:
Figure 12:
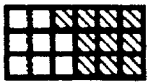
Figure 12:
Figure 12:
Figure 12:
Figure 12:
Figure 12:
Figure 12:
Figure 12:
Figure 12:
Figure 12:
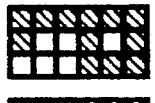
Figure 12:
Figure 12:
Figure 12:
Figure 12:
Figure 13:
Figure 13:
Figure 13:
Figure 13:
Figure 13:
Figure 13:
Figure 13:

Halftone function $H_4(x, y, d)$ defines upper density gray density boundary U(d), lower density gray density boundary L(d) and halftone cell T(m, n) similarly to halftone function $H_3(x, y, d)$. In addition, halftone function $H_4(x, y, d)$ defines cluster boundary S(d) to be used with cluster halftone cells such as halftone cell $T_2(m, n)$ shown in FIG. 8. Halftone cell $T_2(m, n)$ has threshold values that define cluster dot patterns as shown by density threshold pixel growth pattern 80 in cell 81 shown in FIG. 9. Clustered dot patterns 83 and 85 defined according to threshold pixel growth patterns 82 and 84, respectively, of halftone cell $T_2(m, n)$ are generated in accordance with the upper and lower gray density boundaries U(d) and L(d) of halftone function $H_4(x, y, d)$. Since cluster dot pattern 85 begins to form white area 86 in the center of a black spot, cluster boundary S(d) is used to alter pixel growth pattern 87 by adding black pixel 88 in the center of a white spot as shown in cell 89. As defined by halftone function $H_4(x, y, d)$ three tests are required instead of two to perform halftoning. In accordance with the invention, each cluster dot pattern 83, 85, and 89 have increasing gray density as defined by a non-arbitrary growth arrangement of an equal number of pixels.

With reference again to FIG. 7, halftone generator 17 overlays raster input image I(x, y, d) with halftone cell $T_2(m, n)$ (matrix of M×N) in order that a density threshold is assigned to each input image signal. Halftone screen variables u and v are assigned according to the screen angle set by controller 10 at the start of a raster scanline. The variable u and v offset gray pixel positions x and y using adders 30 and 31 respectively. The resulting sums (x+u) and (y+v) are evaluated using modulus M and N (halftone cell size) (e.g. $T_4$(M=6, N=3) at MOD circuits 33 and 34, respectively, to determine halftone cell variable m and n. Once halftone cell variables m and n are determined for a gray input pixel, variables m and n are used to index halftone cell $T_2(m, n)$ stored in halftone threshold look up table (LUT) 35 for a corresponding threshold value. When gray pixel positions (x, y) are transmitted to adders 30 and 31, the density value d of pixel position (x, y) is transmitted to boundary look up table (LUT) 36. In this embodiment, boundary LUT 36 is defined for 5-bit gray density values d, upper gray density boundary U(d), lower gray density boundary L(d) and cluster boundary S(d) values shown in FIGS. 10–13. For each gray density d input to boundary LUT 36 corresponding values for upper U(d) and lower L(d) gray density boundaries and cluster boundary S(d) are output and transmitted to comparators 27, 28 and 37 respectively.

Figure 14:
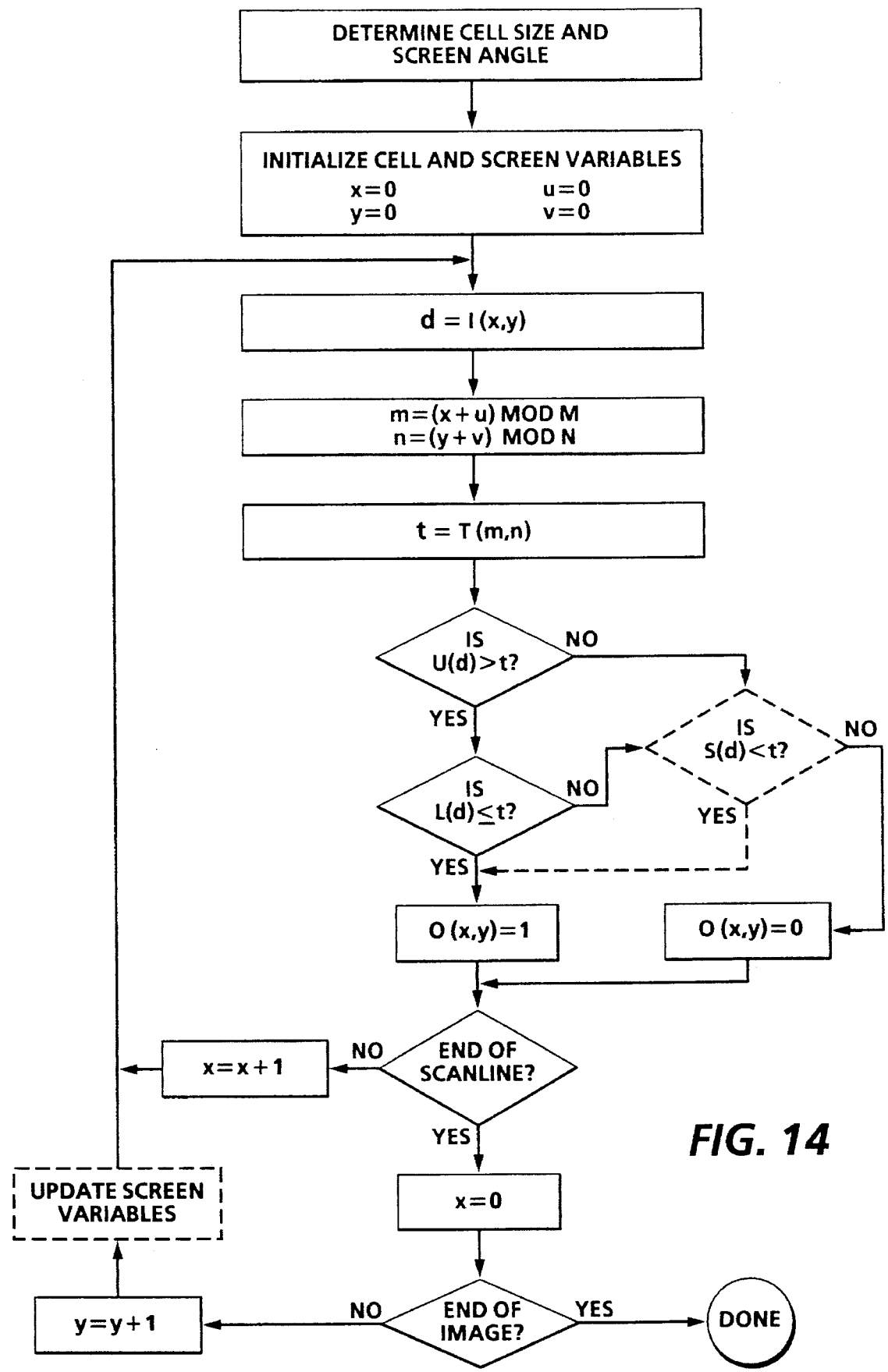
FIG. 14 is a flowchart summarizing the process flow of the halftone generator shown in FIG. 2.
Figure 15:
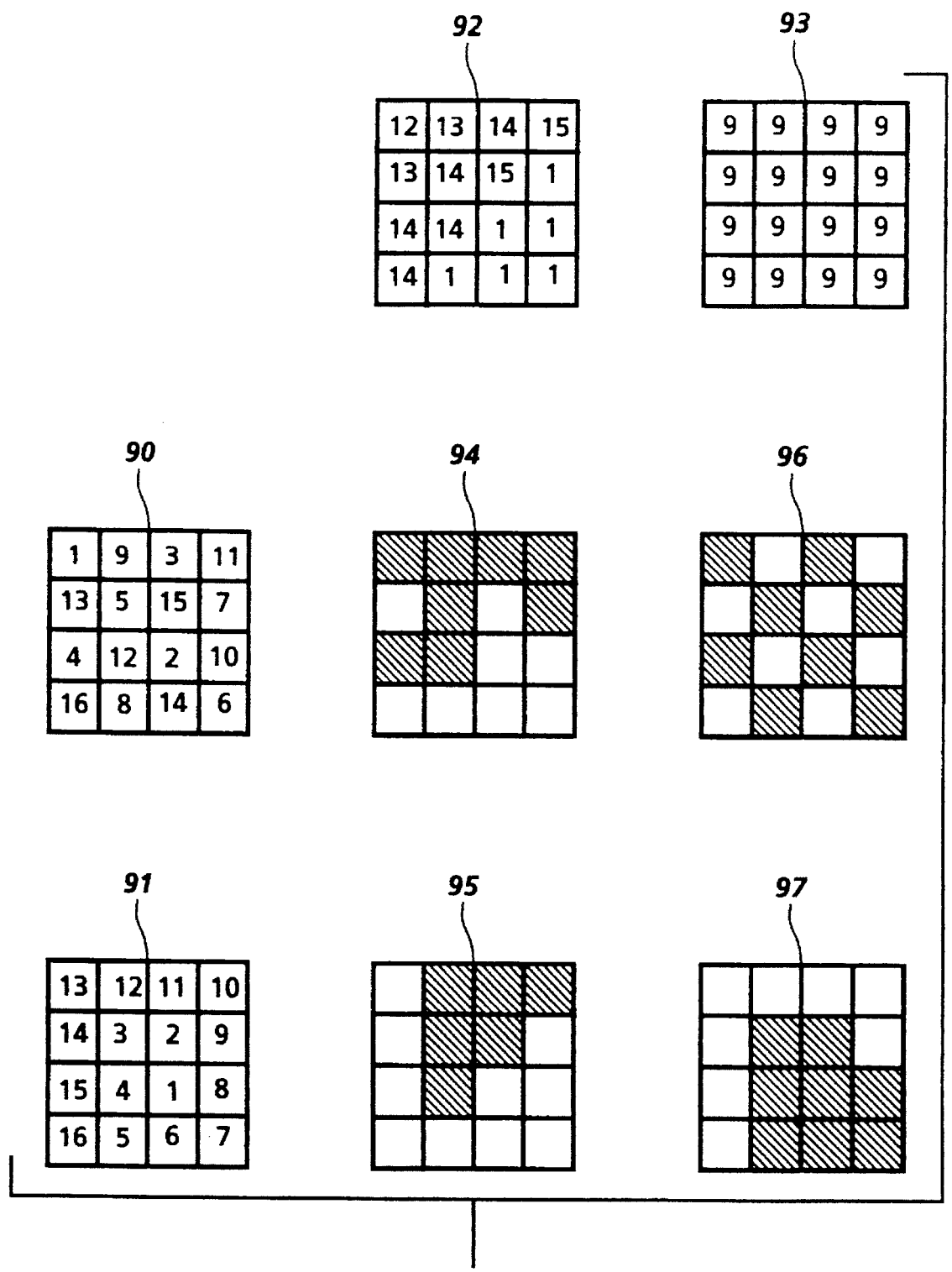
FIG. 15 shows the threshold pattern for a disperse halftone cell and a cluster halftone cell and the resulting halftone density pattern generated using a dither method and a density pattern method.

More specifically, for each gray pixel (x, y) in image I(x, y, d), comparator 27 determines whether upper gray density boundary U(d) is greater than the threshold value assigned from halftone cell $T_2$(m, n). Comparator 28 determines for each gray pixel (x, y) whether lower gray density boundary L(d) is less than or equal to the threshold value assigned from halftone cell $T_2$(m, n). Comparator 37 determines for each gray pixel (x, y) whether cluster boundary S(d) is less than the threshold value assigned from halftone cell $T_2$(m, n). The output from comparators 27 and 28 are subsequently evaluated at AND gate 29. The output of AND gate 29 and comparator 37 are evaluated at OR gate 38 to provide binary output value O(x, y). Output from OR gate 38 is transmitted from halftone generator 17 and stored in memory 10 as a binary value (0 or 1). The binary value indicates whether a pixel in a halftone cell is on or off (e.g. black or white) when reproduced on printer 10. In summary, the process flow of halftone generator 17 implementing both halftoning functions $H_3$(x, y, d) (FIG. 3) and $H_4$(x, y, d) (FIG. 7) is summarized in the flowchart of FIG. 14. The additional steps required to account for cluster boundary S(d) in halftoning function $H_4$(x, y, d) are outlined using dashed lines.

It will no doubt be appreciated that the halftoning technique of the present invention is not limited to grays but can be extended to colors defined for example using combinations of cyan, magenta and yellow (c,m,y) primaries. It will also no doubt be appreciated that the present invention can be simplified so that an average gray density of a set of pixel filling a halftone cell is used instead of each individual pixel to determine a halftone pattern. Although such a simplification introduces the pattern for an entire halftone cell of image signals using a single test, the simplification reduces the effective edge resolution to that of a halftone screen rather than that of a pixel. It will also no doubt be appreciated that the halftone cells $T_1$(m,n) and $T_2$(m,n) used to described two embodiments of the present invention can take on any number of different shapes and sizes and are not limited being formed using cluster dot patterns and can be formed using a dispersed dot pattern or any other random dot pattern.

In summary, the present invention defines halftone patterns with the same number of pixels having different gray density to provide additional halftone patterns while avoiding problems such as the formation of textures at the edges of halftone boundaries. The additional halftone gray levels with different gray density but an equivalent number of pixels are not arbitrarily generated patterns. What is required by the present invention is that a set of boundary values that define how pixels are added to or removed from a halftone dot pattern in the order defined by the threshold values in the halftone pattern. Furthermore, the present invention provides very simple halftoning functions $H_3$(x, y, d) and $H_4$(x, y, d) that require only a fixed amount of additional memory beyond conventional halftoning techniques with which to carry out the principles of the invention.

The disclosed method of halftoning may be readily implemented in software using object oriented software development environments that provide portable source code that can be used on a variety of hardware platforms. Alternatively, the disclosed image processing system may be implemented partially or fully in hardware using standard logic circuits or specifically on a single chip using VLSI design. Whether software or hardware is used to implement the system varies depending on the speed and efficiency requirements of the system and also the particular function and the particular software or hardware systems and the particular microprocessor or microcomputer systems being utilized.

The image processing system, however, can be readily developed by those skilled in the applicable arts without undue experimentation from the functional description provided herein together with a general knowledge of the computer arts.

The invention has been described with reference to a particular embodiment. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

I claim:

1. An apparatus for converting gray image signals to binary image signals, with each gray image signal having a gray density value, comprising:

a memory for storing the gray image signals and the binary image signals, each gray image signal stored in the memory being associated with a relative position in a halftone cell having a set of threshold values;

means, associated with said memory, for assigning a threshold value to each gray image signal in accordance with the relative position of each threshold value in the halftone cell, and defining a range of gray density values for each gray image signal; and a logic circuit, in communication with said assigning means, for forming a halftone density pattern for the gray image signals having the threshold value assigned thereto within the range of gray density values for the corresponding gray image signal.

2. The apparatus according to claim 1, wherein said assigning means comprises:

a first look up table for storing the threshold values for the halftone cell; and a second look up table for storing the range of gray density values for each gray image signal.

3. An apparatus for converting gray image signals to binary image signals, the gray image signals each representing a gray density value, comprising:

a memory for storing the gray image signals and the binary image signals, each gray image signal stored in the memory being associated with a relative position within a halftone cell, the halftone cell having a set of threshold values;

means, associated with said memory, for assigning a threshold value to each gray image signal in accordance with the relative position;

means for defining a range of gray density values for each gray image signal as a function of the gray density value for the gray image signal; and a logic circuit, in communication with said threshold value assigning means and said range defining means, for forming a halftone density output pattern for the gray image signals as a function of the range of gray density values and the threshold value for each of the corresponding gray image signals.

4. The apparatus of claim 3, wherein said logic circuit further comprises:

a first comparator, connected to a logic gate, to signal whether the upper gray density boundary for each gray image signal is greater than the threshold value corresponding to each gray image signal; and a second comparator, connected to the logic gate, to signal whether the lower gray density boundary for each gray image signal is less than the threshold value corresponding to each gray image signal;

wherein the logic gate operates on the signals to output the binary image signals to form the halftone density output pattern.

5. The apparatus of claim 3, wherein said logic circuit operates in accordance with a halftone function H(x, y, d):

$$H(x,y,d)=U(d)>T(m, n) \text{ AND } L(d)\leq=T(m,n),$$

where, x, y=position of a gray density image signal in the image;

d=density of the image signal at position x, y;

T(m, n)=threshold value;

U(d)=upper gray density boundary; and

L(d)=lower gray density boundary.

6. The apparatus according to claim 3, wherein said threshold value assigning means further comprises a third look up table, stored in said memory, for defining a cluster boundary limit for each gray density signal in the image, the cluster boundary limit further defining a growth pattern of the halftone cell.

7. The apparatus according to claim 6, wherein said logic circuit operates in accordance with a halftone function H(x, y, d):

$$H(x,y,d)=((U(d)>T(m,n)) \text{ AND } (L(d)<T(m,n))) \text{ OR } (S(d)<T(m,n)),$$

where, x, y=position of a gray density image signal in the image;

d=density of the image signal at position x, y;

T(m, n)=threshold value;

U(d)=upper gray density boundary;

L(d)=lower gray density boundary; and

S(d)=cluster density threshold limit.

8. The apparatus according to claim 3, wherein said threshold value assigning means comprises a first look up table for storing the threshold values for the halftone cell; and said range defining means comprises a second look up table for storing the range of gray density values for each gray image signal.

9. A method for converting gray image signals to binary image signals, with each gray image signal representing a gray density value, comprising the steps of:

associating each gray image signal with a relative position in a halftone cell, the halftone cell having a set of threshold values associated therewith, wherein each threshold value is associated with a position in the halftone cell;

assigning a threshold value to each gray image signal in accordance with the relative position of each gray image signal in the halftone cell;

defining a range of gray density values for each gray image signal as a function of the gray density value for each gray image signal; and forming a halftone density output pattern in response to gray image signals having an assigned threshold value assigned lying within the range of gray density values defined for the corresponding gray image signal.

10. The method according to claim 9, wherein said forming step comprises the step of recording, in a memory, a binary image signal denoting a black pixel for each gray image signal having an assigned threshold value within the defined range of gray density values, and a binary image signal denoting a white pixel for each gray image signal having an assigned threshold value outside the defined range of gray density values.

11. The method according to claim 10, further comprising the step of reproducing the recorded white pixels and black pixels on an image output terminal.

12. The method according to claim 11, wherein said reproducing step comprises the step of printing the black pixels on a substrate.

13. The method according to claim 9, wherein said associating step comprises the step of offsetting the relative position of each gray image signal in the halftone cell with an offset so as to produce a non-zero screen angle.

14. The method according to claim 9, further comprising the step of prefiltering the gray image stored in the memory in preparation for said associating step.

15. The method according to claim 9, wherein said defining step defines an upper gray density boundary and a lower gray density boundary for each gray image signal.

16. The method according to claim 15, wherein said forming step comprises the step of determining whether the lower gray density boundary is less than the threshold value for each gray image signal.

17. The method according to claim 16, wherein said determining step determines whether the lower gray density boundary is equal to the threshold value for each gray image signal.

18. The method according to claim 15, wherein said determining step determines whether the upper gray density boundary is greater than the threshold value for each gray image signal.

19. The method according to claim 15, wherein said determining step evaluates the upper gray density boundary and the lower gray density boundary for each threshold value assigned to each gray image signal in accordance with a halftone function H(x, y, d):

$$H(x, y, d)=U(d)>T(m, n) \text{ AND } L(d)\leq T(m, n),$$

where, x, y=position of a gray density image signal in the image;

d=density of the image signal at position x, y;

T(m, n)=threshold value;

U(d)=upper gray density boundary; and

L(d)=lower gray density boundary.

20. The method according to claim 19, wherein said assigning step locates a threshold value according to the following function:

$$T(m, n)=T(x \text{ MOD } M, y \text{ MOD } N),$$

where, x, y=position of a gray density image signal in the image;

M, N=dimensions of the halftone cell; and

T(m, n)=threshold value.

21. The method according to claim 15, wherein said defining step defines the upper gray density boundary and the lower gray density boundary in accordance with a predefined pixel growth pattern, the predefined pixel growth pattern being established by a predetermined density threshold associated with each one of a plurality of positions in the halftone cell.

22. The method according to claim 15, further comprising the step of defining a cluster boundary limit for each gray density signal, the cluster boundary limit further defining a growth pattern of the halftone cell.

23. The method according to claim 22, wherein said determining step evaluates the upper density threshold limit and the lower density threshold limit for each density threshold value assigned to each gray density image signal in accordance with a halftone function H(x, y, d):

$$H(x,y,d) = ((U(d) > T(m,n)) \text{ AND } (L(d) \leq T(m,n))) \text{ OR } (S(d) < T(m,n)),$$

where, x, y = position of a gray density image signal in the image;
d = density of the image signal at position x, y;
T(m, n) = threshold value;
U(d) = upper gray density boundary;
L(d) = lower gray density boundary; and
S(d) = cluster density threshold limit.

24. A method for forming a first plurality of halftone density patterns in an image processing system from a pixel growth pattern of a halftone cell, the halftone cell having a second plurality of density threshold values, each density threshold value being associated with a pixel position within the halftone cell, plurality is greater than the second plurality comprising the step of:

altering the pixel growth pattern of the halftone cell using a selected range of density values for each pixel position in the halftone cell; and defining the selected range of density values such that pixels are added and removed along the pixel growth pattern of the halftone cell to alter perceived densities of halftone density patterns having equal numbers of pixels rendered in a common output color.

25. The method of claim 24, wherein said altering step includes the step of defining a lower gray density boundary and an upper gray density boundary for the selected range of density values.

26. The method of claim 25, wherein said altering step includes the step of defining a cluster density threshold limit for the selected range of density values.

27. The apparatus of claim 8, wherein said second look up table has stored in said memory an upper gray density boundary and a lower gray density boundary that define the range of gray density values for each gray image signal.

28. The apparatus according to claim 3, wherein said logic circuit outputs a binary image signal denoting a black pixel for each gray image signal having a threshold value within the defined range of gray density values, and a binary image signal denoting a white pixel for each gray image signal having a threshold value outside the defined range of gray density values.

* * * * *